Feb. 3, 1942.        S. HOLM        2,271,863
STATIC PRESSURE MEASURING TUBE
Filed Sept. 18, 1940
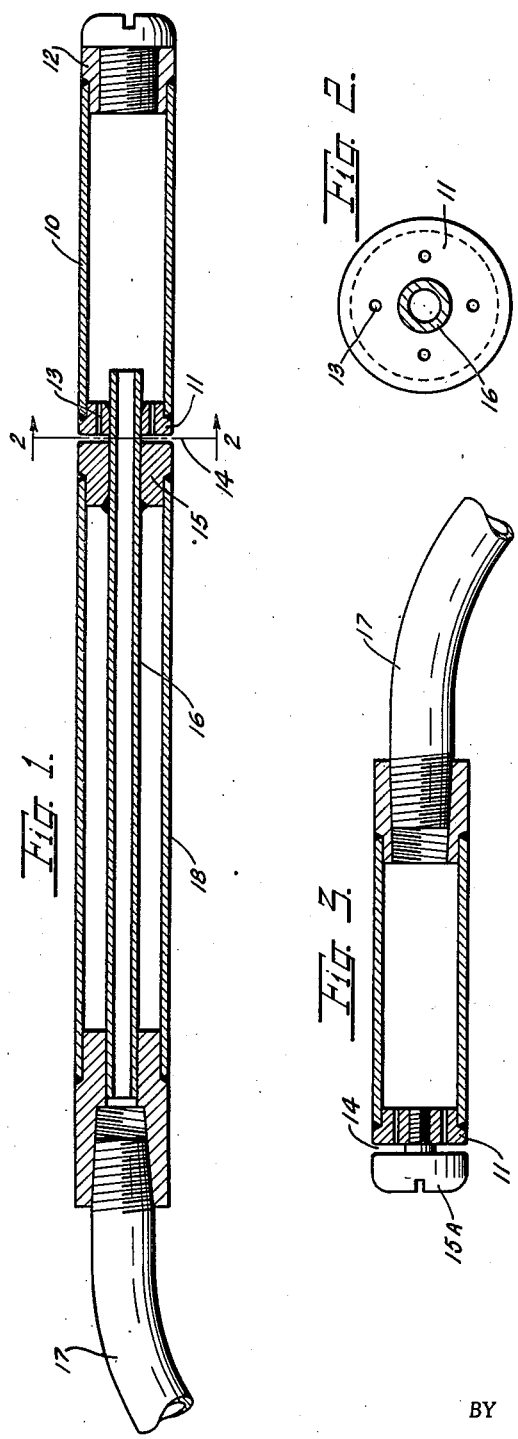
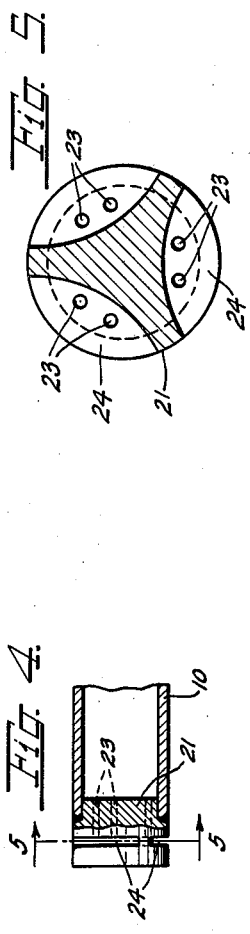
INVENTOR.
SVEN HOLM.
BY 

Patented Feb. 3, 1942

2,271,863

UNITED STATES PATENT OFFICE 2,271,863

STATIC PRESSURE MEASURING TUBE

Sven Holm, Wellsville, N. Y., assignor to The Air Preheater Corporation, New York, N. Y.

Application September 18, 1940, Serial No. 357,235

3 Claims. (Cl. 73—31)

My invention relates to measuring devices and particularly to improvements in apparatus for measuring the static pressure of a gas flowing through a duct.

When attempting to measure the pressure of a gas stream it is frequently difficult to obtain a true static pressure reading on a manometer or other indicating device because the reading obtained is often a combination of the static pressure and the velocity or impact pressure. This condition is particularly true in obtaining readings of gas flow through ducts having bends and changes in the cross section as these contribute to produce a turbulent gas stream.

The object of the invention is to provide a static pressure measuring tube in which the velocity and impact pressure of a gas are eliminated as completely as possible. In carrying out the invention this is attained by approaching as closely as possible the condition of a smooth and uniform gas flow over openings in the tube through which the pressure is transmitted to the indicating device. Several illustrative embodiments of the invention will be described hereafter in conjunction with the accompanying drawing in which:

Figure 1 is a longitudinal sectional view of a static pressure measuring apparatus embodying my invention.

Figure 2 is an enlarged sectional view on the line 2—2 in Figure 1.

Figures 3 and 4 are views similar to Figure 1 illustrating modified forms of static pressure tube embodying the invention and Figure 5 is an enlarged sectional view on the line 5—5 in Figure 4.

In Figures 1 and 2 the apparatus comprises a metallic tube 10 which is closed at both ends by plugs 11 and 12. The closure member 11 at the left hand end of the tube is formed with a plurality of very small circumferentially spaced orifices 13 extending axially of the tube and placing its interior in communication with a narrow slot 14 that extends transversely of the tube. Slot 14 is formed between closure member 11 and a member 15 located opposite the outer ends of the orifices 13 and so closely adjacent to the closure member 11 that the width of the peripheral slot 14 is very much smaller than the diameter of tube 10. A smaller tube 16 extends through the members 11 and 15 so that pressure communicated to the interior of the tube 10 from slot 14 may be transmitted through a connection 17 to a suitable pressure indicating device. Concentric with the small tube 16 is a tube 18 of the same diameter as the tube 10 and serving to form a rigid structure and provide a smooth surface for the full length of the measuring apparatus.

In the modified form illustrated in Figure 3 the connection 17 leading to the indicator is made at the right hand end of the tube 10 instead of the left as in Figure 1. Here also the member 15A that cooperates with the closure member 11 to form the narrow slot 14 is carried by the closure member.

In the construction shown in Figures 4 and 5 the slot forming member 15 and the closure member 11 are combined into a single piece. This consists of a cylindrical closure member 21 for the left hand end of the tube 10 having its side wall slotted at several circumferentially spaced points to form narrow peripherally extending slots 24. Each of these narrow slots 24 communicates with the interior of the tube 10 by means of one or more small orifices 23.

In constructing pressure measuring tubes of the type described herein, I have found that with a tube of ¾ inch diameter a slot of a width of about $\frac{1}{32}$ inch and orifices of a diameter of approximately .04 inch are suitable.

When a pressure measuring tube as constructed above is inserted in a duct through which a gas stream flows at high velocity, the flow through the slot 14 or 24 is very much retarded due to friction and consequently, turbulence at the orifices 13 or 23 becomes impossible on account of the low velocity and the small space afforded by a slot of such narrow width. Also as shown in the drawing the edges of the parts defining the edges of the slots 14 and 24 are rounded thereby further reducing the liability of turbulence. Therefore, the resultant pressure in the slot is equivalent to the true static pressure in the duct at the point where the slot is located and this pressure is transmitted from the slot through the orifices 13 or 23 to the interior of the tube 10 and thence to the indicating instrument.

The tube may be inserted at any angle with respect to the gas stream and yet afford correct readings. When the tube is inserted parallel to the stream with the free end pointing upstream it is desirable to have the tube of such length from the slot to its free end that no disturbances occur at the slot. For use in measuring pressures at points spaced transversely of a gas duct it is desirable that the slot should be located as close to the free end of the tube as possible without being affected by eddies that might occur at the end of the tube. This permits the measurement of static pressure at points close to the far side duct wall. Another feature of the measuring tube described above is that the static pressure impulse is received only at the slot and therefore the point of measurement is very sharply defined. This is obviously a distinct advantage when it is desired to make readings at a number of points spaced transversely of a gas duct.

What is claimed is:

1. Apparatus for measuring the static pressure of a gas flowing through a duct comprising; a closed tube having a closure member at one end thereof formed with a plurality of small orifices extending axially of the tube for admitting gas to its interior; means disposed opposite and closely adjacent the outer ends of said orifices to form one or more narrow slots extending transversely of the tube axis wherein gas flowing across said end of the tube forms a fine, turbulent free gas film of low velocity flowing over said orifices; and means connecting the interior of said tube to a pressure indicator.

2. Apparatus for measuring the static pressure of a gas flowing through a duct comprising a closed tube having a closure member, at one end thereof formed with a plurality of small orifices extending axially of the tube for admitting gas to its interior; means mounted opposite the outer end face of said closure member and positioned so closely adjacent thereto as to form a slot extending transversely of the tube axis and substantially narrower in width than the tube diameter wherein gas passing over said end of the tube forms a fine, turbulent free gas film of low velocity flowing over said orifices; and means for connecting the interior of said tube to a pressure indicator.

3. Apparatus for measuring the static pressure of a gas flowing through a duct comprising a tube closed at both ends and adapted to have one end projected into the gas duct to take pressure readings; means positioned opposite said end of the tube and cooperating therewith to form a slot extending transversely of the tube, said means being so closely adjacent to the end of said tube that said slot is so narrow that only a film of gas may flow therethrough; said tube being provided with passages placing said slot in communication with the interior of the tube; and means for connecting the interior of said tube to a pressure indicating device.

SVEN HOLM.